(12) United States Patent
Hopper et al.

(10) Patent No.: US 9,506,310 B2
(45) Date of Patent: Nov. 29, 2016

(54) FLOW BLOCK

(75) Inventors: Hans Paul Hopper, Aberdeen (GB);
Andrew Bean, Bierley (GB)

(73) Assignee: OneSubsea IP UK Limited, London (GB)

( * ) Notice: Subject to any disclaimer, the term of this patent is extended or adjusted under 35 U.S.C. 154(b) by 1264 days.

(21) Appl. No.: 12/438,513

(22) PCT Filed: Aug. 21, 2007

(86) PCT No.: PCT/GB2007/050501
§ 371 (c)(1),
(2), (4) Date: Aug. 26, 2009

(87) PCT Pub. No.: WO2008/023203
PCT Pub. Date: Feb. 28, 2008

(65) Prior Publication Data
US 2010/0011557 A1    Jan. 21, 2010

(30) Foreign Application Priority Data

Aug. 25, 2006  (EP) ................................ 06119576

(51) Int. Cl.
| | | |
|---|---|---|
| *F16L 41/02* | (2006.01) | |
| *E21B 33/04* | (2006.01) | |
| *B23P 15/00* | (2006.01) | |
| *E21B 33/03* | (2006.01) | |

(52) U.S. Cl.
CPC .............. *E21B 33/04* (2013.01); *B23P 15/001* (2013.01); *E21B 33/03* (2013.01); *F16L 41/026* (2013.01); *Y10T 29/49826* (2015.01)

(58) Field of Classification Search
CPC ....... E21B 33/04; E21B 33/03; F16L 41/026

USPC .............. 285/182, 179.1, 179, 129.1, 130.1, 285/133.11, 189, 190, 192, 194
See application file for complete search history.

(56) References Cited

U.S. PATENT DOCUMENTS

| | | | | |
|---|---|---|---|---|
| 440,864 | A | * 11/1890 | Knight ........................ | 285/179.1 |
| 1,165,253 | A | * 12/1915 | Heggem ..................... | 285/272.1 |
| 1,861,314 | A | * 5/1932 | McAndrew ................. | 285/179.1 |
| 2,092,261 | A | * 9/1937 | Rector ..................... | E21B 33/04 |
| | | | | 166/95.1 |

(Continued)

FOREIGN PATENT DOCUMENTS

| | | |
|---|---|---|
| DE | 1947398 | 4/1971 |
| EP | 0106424 A1 | 4/1984 |

(Continued)

OTHER PUBLICATIONS

PCT/GB2007/050501 International Preliminary Report on Patentability, Mar. 12, 2009, pp. 1-10.

*Primary Examiner* — David E Bochna
(74) *Attorney, Agent, or Firm* — Chamberlain Hrdlicka

(57) ABSTRACT

A method of manufacturing a flow block for use as a T-Block, tree block, manifold block or valve block, the method including: machining a main bore in a body; forming an opening in the body in a side wall of the main bore; providing an insert including a first bore intersecting with a second bore and being in fluid communication with each other; forming a substantially curved surface on at least part of the intersection between the first bore and the second bore; and inserting the insert into the opening, such that the first bore is substantially aligned with the main bore in order to provide a fluid flow path between the main bore and the second bore.

16 Claims, 9 Drawing Sheets

(56) References Cited

U.S. PATENT DOCUMENTS

| | | | | |
|---|---|---|---|---|
| 2,148,360 | A | * | 2/1939 | Lemley .................. E21B 33/04 166/88.1 |
| 2,480,858 | A | * | 9/1949 | Hobbs ........................... 285/190 |
| 3,043,371 | A | * | 7/1962 | Rector ......................... 166/97.1 |
| 3,050,126 | A | * | 8/1962 | Lebeaux ................ E21B 33/03 137/861 |
| 3,232,645 | A | * | 2/1966 | Bucks ...................... 285/133.11 |
| 3,739,804 | A | | 6/1973 | Dubreuil |
| 3,760,842 | A | * | 9/1973 | Mikiya ..................... 285/132.1 |
| 4,513,823 | A | * | 4/1985 | Hynes et al. ................. 166/386 |
| 5,366,369 | A | * | 11/1994 | Gellert .......................... 425/549 |
| 5,762,976 | A | * | 6/1998 | Brown .......................... 425/190 |
| 5,865,472 | A | * | 2/1999 | Freynhofer ................... 285/179 |
| 5,884,706 | A | * | 3/1999 | Edwards .............. E21B 33/035 166/335 |
| 6,007,108 | A | * | 12/1999 | Braun .......................... 285/179 |
| 6,345,668 | B1 | * | 2/2002 | Reilly .................... E21B 33/04 166/208 |
| 6,453,995 | B2 | * | 9/2002 | Gatherar et al. ........... 166/75.14 |
| 6,651,746 | B2 | * | 11/2003 | Boyd .............................. 166/379 |
| 7,596,996 | B2 | * | 10/2009 | Zollo et al. ................... 166/348 |
| 8,752,632 | B2 | * | 6/2014 | Agerbæk ...................... 166/344 |
| 2006/0038399 | A1 | | 2/2006 | Tremoulet, Jr. et al. |

FOREIGN PATENT DOCUMENTS

| | | | |
|---|---|---|---|
| EP | 0152263 A3 | 8/1985 | |
| GB | 131246 | 8/1919 | |
| GB | 179373 | 5/1922 | |
| GB | 601080 | 4/1948 | |
| GB | 2073783 A | 10/1981 | |
| GB | 2169687 A | 7/1986 | |
| GB | 2296058 A | 6/1996 | |
| GB | 2352258 A * | 1/2001 | ............ E21B 33/04 |

* cited by examiner

SECTION A-A

FLOW BLOCK

CROSS-REFERENCE TO RELATED APPLICATIONS

This application is a national phase entry of prior PCT Application No. PCT/GB2007/050501, filed 21 Aug. 2007, and entitled Flow Block, hereby incorporated herein by reference, which claims the benefit of EPO Patent Application No. 06119576.4, filed 25 Aug. 2006, and entitled Flow Block, hereby incorporated herein by reference.

STATEMENT REGARDING FEDERALLY SPONSORED RESEARCH OR DEVELOPMENT

Not Applicable.

BACKGROUND

In the art of oil exploration, a tree is a pressure safety device consisting of a tee-piece on a wellhead which allows vertical intervention and allows fluids to flow through a horizontal or angled lateral port into or out of the well bore. The flow junction in either a surface or subsea tree is achieved using a tree block. The junction is machined from a solid block because a welded junction would not meet the necessary integrity and bending moment requirements. The junction is generally at a 90° angle.

The parent metal of the body, usually steel, is rarely suitable to handle the range of fluids found and used in a production oil well. The possibility of corrosion, erosion, hydrogen or carbon dioxide embrittlement requires the wetted surfaces of the bores and the outer portions of the body itself to be protected. This protection is usually achieved by nickel alloy such as Inconel® lining the surfaces by continuous welding of a wall of nickel alloy material to the parent metal wall. When striking an arc, and until the weld is established, an inconsistent quality weld bead is laid which is not acceptable. The same occurs when the weld is stopped and started, which occurs when the weld gun has to traverse an opening or side port. To clad steel surfaces in nickel alloy is a complex welding procedure. To clad the surfaces of the bore using nickel alloy welding, an electric welding arc must be kept at a precise distance from the metal surface to ensure a consistent weld quality. At a junction on a tree block between a production bore and a side outlet, the rotating weld has to jump the bore and then resume once across. The quality when the weld arc is resumed can suffer. A known solution to this problem is shown in FIGS. 1a to c.

FIG. 1 shows a typical wellhead tubing hanger with its lower end on the right (the wellhead is not shown in FIG. 1) at various stages in its manufacture. FIG. 1a shows a cross section of a tubing hanger which has a substantially circular cylindrical body 10. A bore 11 is machined in the body 10 which in use will provide a passage for production fluid or water injection fluid. An opening 12 is machined on the side wall of the body 10. In use, either production fluid will flow from the bore 11 to the opening 12 or water or gas injection flow fluid will flow from the opening 12 to the bore 11. The flow of fluid in FIG. 1 is from the right hand side of the bore 11 to the opening 12, or vice versa.

As described above, it is necessary to coat all well fluid wetted surfaces of the tubing hanger with nickel alloy. The surfaces that need to be clad are the inner surface 13 of the bore 11 and certain portions of the outer diameter 14 of the tubing hanger. To ensure a consistent well quality, a solid cylindrical nickel alloy plug 15 of circular cross section is inserted into the opening 12 as shown in FIG. 1b. This results in the surface of the bore 11 and the outer diameter 14 of the body 10 having a substantially flush surface, all the way around the body 10. In the next step, an electric arc is used to nickel alloy clad the body 10 to create cladding 16 on the surface of the bore 13 and cladding 17 on the outer diameter 14 of the body 10. The nickel alloy plug 15 allows the electric arc to be kept at a constant distance from the outer diameter 14 of the body 10 when the arc rotates around the outside of the body, or the body is rotated around the arc.

The next step of the process is shown in FIG. 1c where the center of the nickel alloy plug 15 is machined out leaving a sufficient amount of nickel alloy on the side walls of the opening 12. As can be seen, all the well fluid wetted surfaces of the tubing hanger are now clad in nickel alloy. Although the process shown in FIGS. 1a to 1c helps to provide a consistent weld quality, the use of a sacrificial nickel alloy plug is undesirable because it requires considerable machining time to bore out the plug. Alternatively, instead of using an insert plug, the opening 12 is welded solid using nickel alloy.

For pressure containing equipment, especially oil field hydrocarbon pressure containing equipment, the metallurgic consistency structure of the parent body to withstand the hydrostatic forces is paramount. The body must have an equal consistency throughout its shape. Precise geometric surfaces, which are required in this field, cannot be achieved by casting and hence the bores are machined in the solid forged body.

SUMMARY

According to at least one embodiment, there is provided a method of manufacturing a flow block for use as a T-Block, tree block, manifold block or valve block, the method comprising the steps of: machining a main bore in a body; forming an opening in the body in a side wall of the main bore; providing an insert having a first bore intersecting with a second bore and being in fluid communication with each other; forming a substantially curved surface on at least part of the intersection between the first bore and the second bore; and inserting the insert into the opening, such that the first bore is substantially aligned with the main bore in order to provide a fluid flow path between the main bore and the second bore.

The use of an insert reduces the machining time as described in relation to FIG. 1. In particular, the insert can be easily machined because of its compact size relative to the body.

The use of a curved surface reduced the level of turbulence in fluid when it flows around the junction in the body between the main bore and the opening. A reduction in turbulence allows the use of smaller bores. By "substantially curved surface" or "curved surface" we mean a smoothly curved surface or a series of sloped surfaces that approximate a curve. The curved surface may be formed by machining.

The intersection between the first bore and the second bore preferably defines a corner, about which fluid flows in use and the curved surface may be formed on the intersection at the inside of the corner of the fluid flow.

A substantially curved surface may be formed on the intersection at the outside of the corner of the fluid flow.

The curved surface may be formed around the entire intersection of the first bore and the second bore. The substantially curved surface may be formed as a convex surface.

The insert may be welded and sealed into the opening in the body. The welding may be nickel alloy welding.

The body and the insert may be formed from the same material or they may be formed from different materials. The insert portion may be formed from nickel alloy material.

The method may further comprise: forming a recess in the body in the side wall of the main bore, opposite the opening; and inserting the insert into the opening such that a part of the insert is located within the recess.

The insert may be inserted into the opening so that the main bore and the first bore are concentric; and wherein the insert is formed so that the diameter of the first bore is equal to the diameter of the main bore.

The insert may be inserted into the opening so that the main bore and the first bore are concentric; and wherein a part of the first bore has a larger diameter than the main bore such that the second bore extends into the recess.

The method may further comprise: forming a second opening in the body in the side wall of the main bore and inserting the insert into the second opening as well as the first opening.

According to at least a second embodiment, there is provided a flow block for use as a T-Block, tree block, manifold block or valve block, the block comprising: a body having a main bore machined in the body and a side bore, the body being formed in at least two portions, a first portion containing the main bore, and a second portion containing the side bore and the curved surface; wherein the side bore intersects the main bore and is in fluid communication with the main bore; and wherein a substantially curved surface is provided on at least part of the intersection between the main bore and the side bore.

The intersection between the main bore and the side bore preferably defines a corner about which fluid flows in use; and wherein the curved surface may be disposed on the intersection at the inside of the corner of the fluid flow.

The curved surface may be provided around the entire intersection of the main bore and the side bore.

The radius of the curved surface may be greater than 25% of the diameter of the side bore.

The radius of curvature of the curved surface may be approximately 50% of the diameter of the side bore.

The substantially curved surface may be a convex surface. At least one weld may be provided between the first portion of the body and the second portion of the body.

The first and second portions of the body may be formed from the same material or they may be formed from different materials.

The second portion may be formed from nickel alloy or Tungsten material. The side bore is perpendicular to the main bore or the side bore may be at a non-ninety degree angle to the main bore.

A recess may be provided in the body in a side wall of the main bore, opposite the side bore.

The block may further comprise a second side bore intersecting the main bore, the second side bore being in fluid communication with the main bore; wherein a substantially curved surface is provided on at least part of the intersection between the main bore and the second side bore.

According to at least a third embodiment, there is provided a flow block assembly for use as a T-Block, tree block, manifold block or valve block, the assembly comprising: a body having a machined main bore and an opening in the body in a side wall of the main bore; a preformed insert having a first bore intersecting with a second bore and being in fluid communication with each other; wherein, in use, the insert is inserted into the opening in the body such that the main bore and the second bore are in fluid communication with each other; wherein the insert is provided with a substantially curved surface on at least part of the intersection between the first bore and the second bore.

BRIEF DESCRIPTION OF THE DRAWINGS

Embodiments will be described with reference to the accompanying figures in which.

DETAILED DESCRIPTION OF THE EMBODIMENTS

Figure 1C:
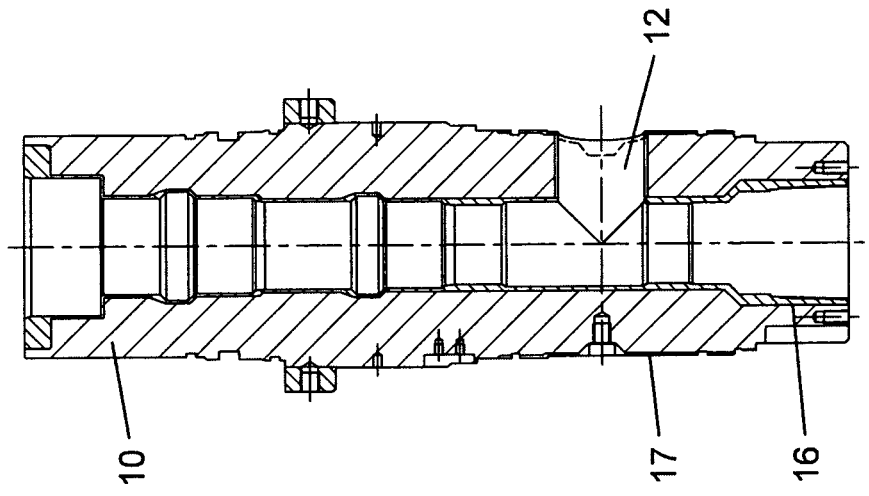
FIGS. 1a to c show cross sections of a prior art tubing hangar.
Figure 1B:
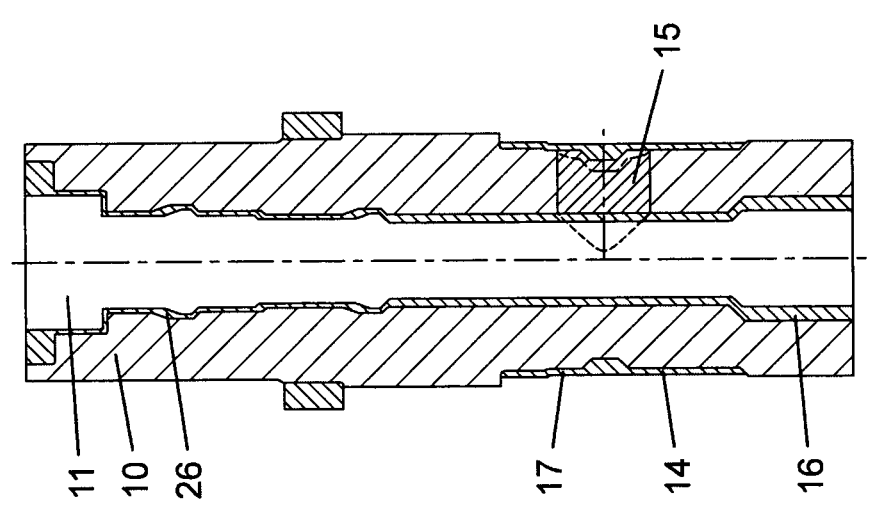
Figure 1A:
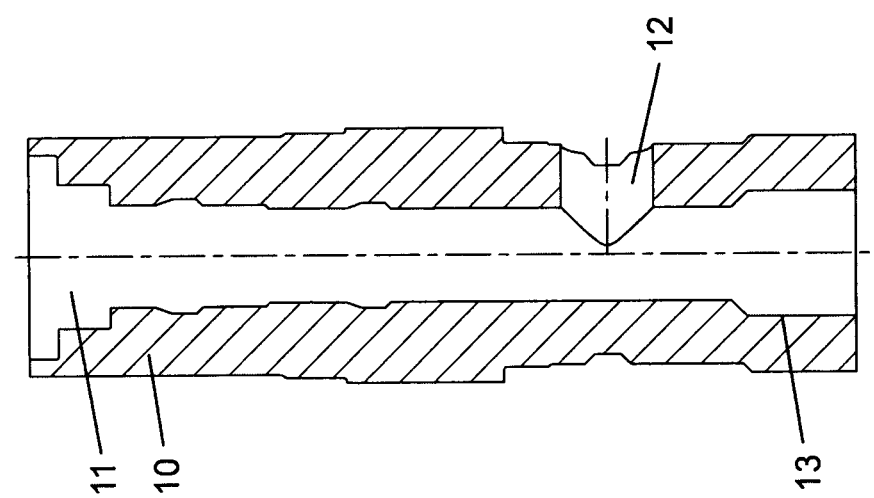
Figure 2A:
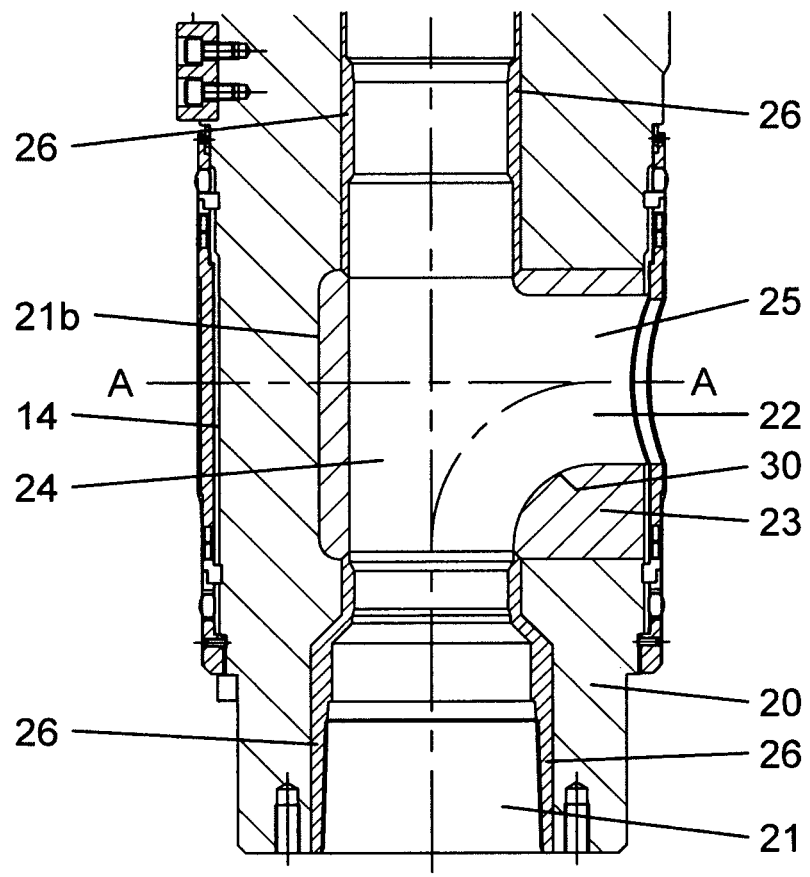
FIGS. 2a and 2b show cross sections of a block according to a first embodiment including a main bore and a side outlet.
Figure 2B:
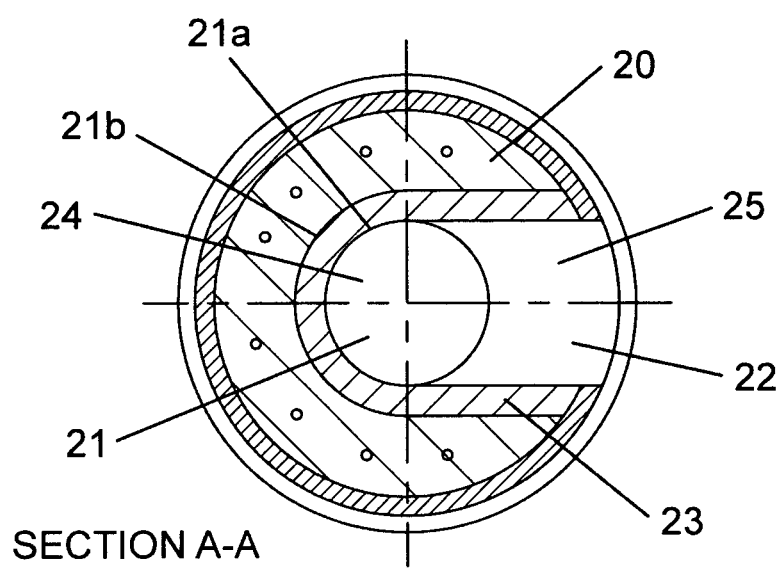
Figure 2C:
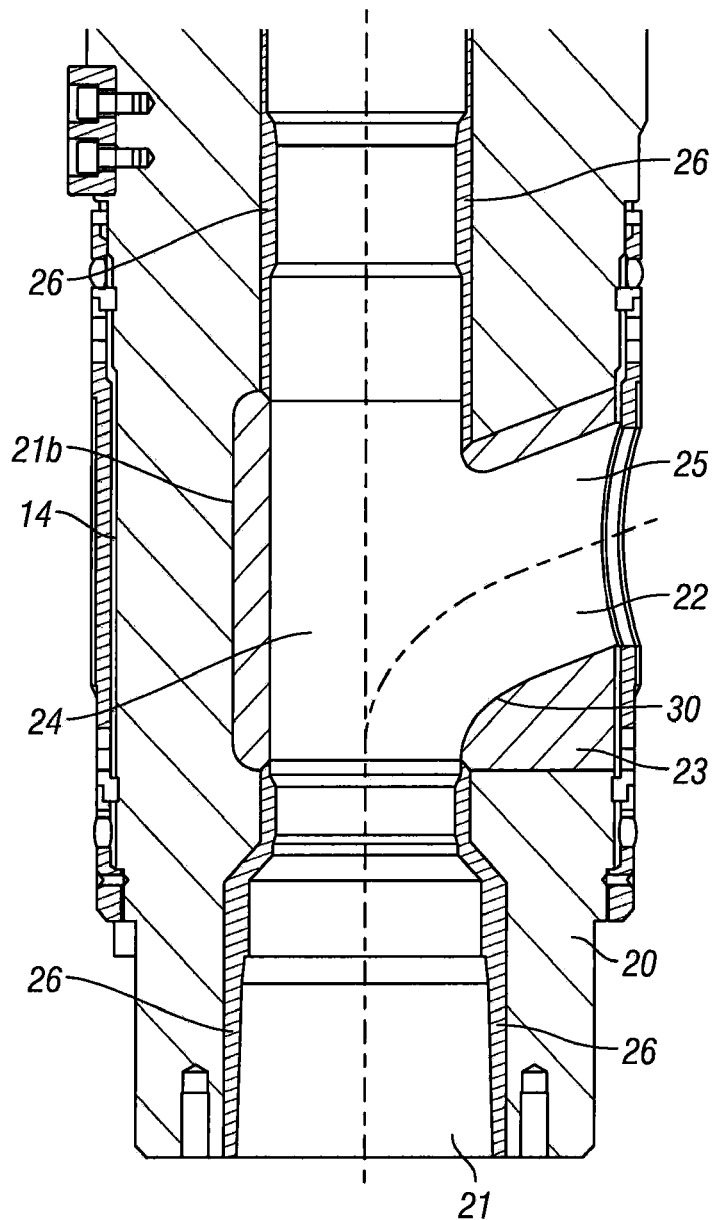
FIG. 2c shows a cross section of a block according to the first embodiment including a main bore and a side outlet at a non-ninety degree angle to the main bore.

FIGS. 2a and 2b illustrates a tree block in a tubing hangar comprising a body 20 having a main bore 21 for production fluid. The main bore 21 is machined in the body 20. An opening 22 is machined in the side wall of the body 20 and extends into the main bore 21. The tree block is formed when a side outlet (not shown) is connected to the opening 22 such that a fluid path is established between the main bore 21 and the side bore. The main bore 21 and the side bore are in this example, perpendicular, but there may be situations in which this is undesirable and they may be non-perpendicular as shown in FIG. 2c.

In this example, a rectangular opening is formed in the side wall of the body 20 and this rectangular opening extends across the bore 21 into the opposite side of the bore 21 such that the diameter of the bore 21 is increased from an initial diameter shown at 21a to an enlarged diameter shown at 21b. The insert 23 has a rectangular cross section which is why a rectangular opening is used. However, the insert can have a cross section of another shape and the opening in the body would be shaped to match that of the cross section of the insert.

An insert 23 having an outer shape corresponding to the opening 22 is then inserted into the opening 22. The insert 23 is formed from nickel alloy material and consists of a machined first bore 24 and a machined secondary bore 25 formed at a right angle to each other.

The insert 23 is disposed in the opening 22 such that the insert's first bore 24 is aligned with the main bore 21. This is achieved, as seen in FIG. 2a, by the insert extending into the enlarged diameter formed by the opening 22 such that the insert's first bore 24 is aligned with and concentric with the main bore 21. Fluid communication is thus established between the main bore 21 and the side outlet (not shown) via the first bore 24 and the second bore 25 of the insert 23.

To meet corrosion and erosion requirements, the inner diameter 21a of the bore 21 is clad with Inconel®, by nickel alloy welding as shown at 26. The nickel alloy cladding 26 extends from the insert 23 to each end of the tubing hangar. The insert 23 itself does not need to be clad because it is made of nickel alloy. The bore 21 is subsequently machined out to leave a smooth flush surface between the nickel alloy cladding 26 and the insert 23.

The outer diameter 14 of the body 20 is also clad with nickel alloy at certain locations. To achieve a consistent quality weld bead on the outer diameter of the body, a sacrificial steel plug is located in the insert's second bore 25 in such a position that a surface of the sacrificial plug is substantially flush with the outer diameter of the body 20, so that the entire circumference of the body 20 at the position of the insert 23 is solid. A nickel alloy cladding can then be welded onto the outer diameter of the body 20 with a consistent quality weld because there will be no breaks in the weld which will affect the quality of the weld. The sacrificial steel plug can subsequently be machined out.

The insert 23 also comprises a curved surface shown at 30 in FIG. 2a. The curved surface 30 is disposed at the inside corner of the intended flow path of fluid between the main bore 21 and the side outlet (not shown). It has been found that the curved surface helps to reduce turbulence in the flow paths when compared to a conventional 900 inside corner used in prior tubing hangars. By 90° inside corner we mean that the inner surface of the bore 21 and the opening 22 meet at a right angle and form an edge. The curved surface 30 helps to prevent areas of recirculation around the corner when the fluid flows from the main bore 21 to the side outlet. The inventors of this application have investigated prior art tubing hangars and in particular the flow path between the main bore and the side bore which flows around the right angled edge of the 90° inside corner. A 90° inside corner is the norm in prior art tubing hangars because of the ease of machining. The inventors have learnt from computer modelling that the effective flow area in the prior art is reduced causing a maximum velocity increase of 79% because of the region of recirculated flow around the 90° inside corner and to achieve a suitable flow rate, the velocity of the flow actually has to increase. Therefore, a 90° flow path around the inside corner creates turbulent flow and the corresponding high velocity in the fluid causes high shearing within the fluid. In a multi-phased fluid (as is often found in oil production), foaming and emulsions are formed in the fluid. This is undesirable because the next process stage is often the separation of the phases. Because of the state of the fluid which has been subject to shearing, the fluid will require a long time to settle which results in a larger and more expensive separation infrastructure.

Figures 8A, 8B:
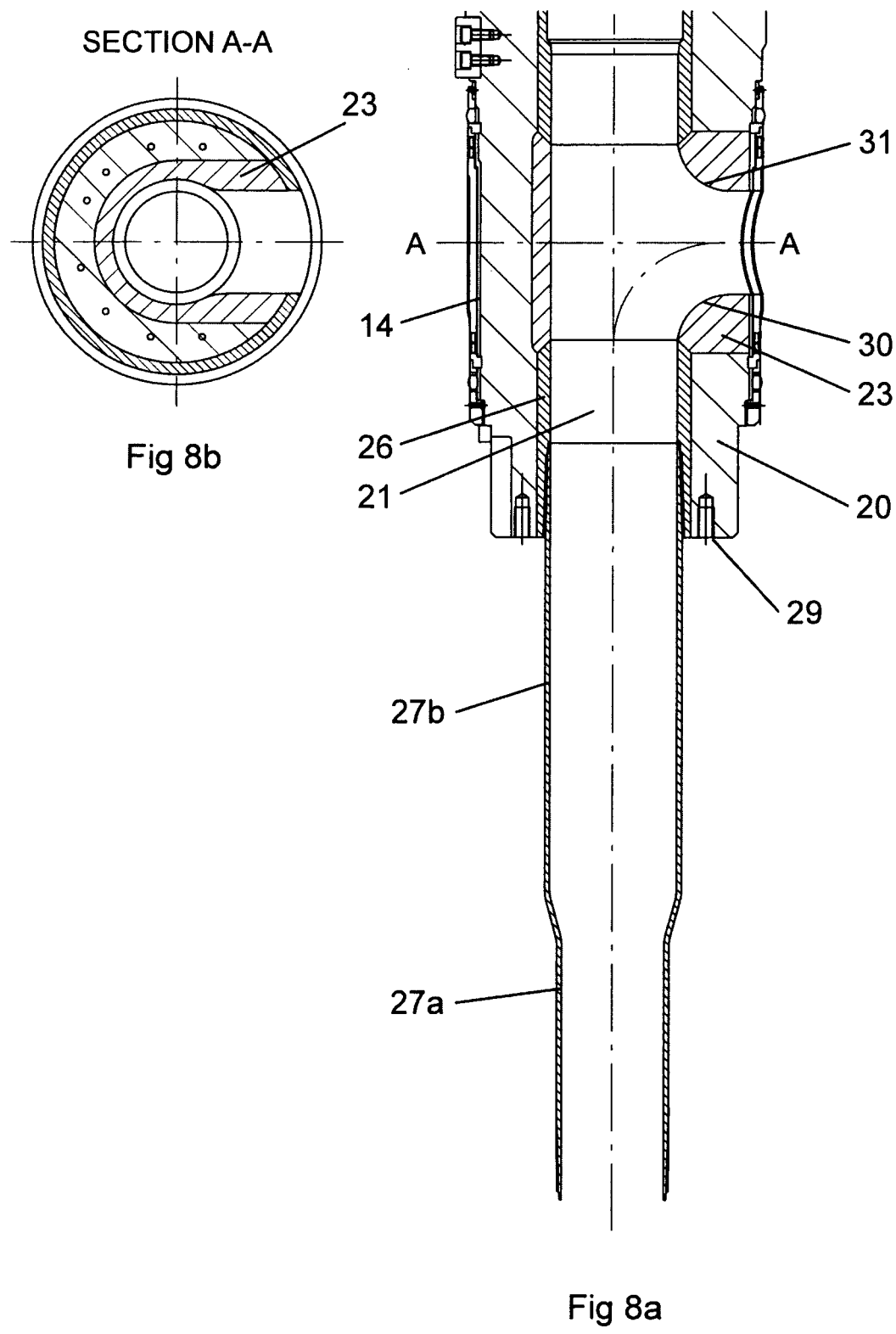
FIGS. 8a and 8b show cross sections of a block according to a seventh embodiment including a main bore and a side outlet.

The use of curved surface 30 on the insert 23 allows the fluid to flow around the corner with only a 36% increase in maximum velocity and therefore with reduced turbulence and hence reduced shearing. Accordingly, the side outlet (not shown) can be manufactured with a smaller diameter (as compared to prior art side outlet) because all of the cross-sectional area of the side outlet is effectively used. This is particularly advantageous because it reduces weight and cost. Further improvements can be found by enlarging the diameter of the main bore 21 in the body 20 such that the maximum velocity of the fluid in the main bore 21 is reduced, which in turn reduces the turbulence in the fluid. This is shown in FIGS. 8a and 8b.

The insert 23 is machined from a solid block of nickel alloy during which the insert's first bore 24 and second bore 25 are formed. The corner between the bores 24, subsequently machined by inserting a tool into the insert 23 (via the bores 24, 25) to create the curved surface 30. It is only possible to machine the curved surface 30 because it is formed on the insert 23. It is not possible to machine a curved surface on the body 20 of the tubing hangar directly because an appropriate angled machining tool can not be inserted through the main bore 21. In this example the insert is machined, but it could also be forged or cast depending on the type of material used for the insert.

Figure 3:
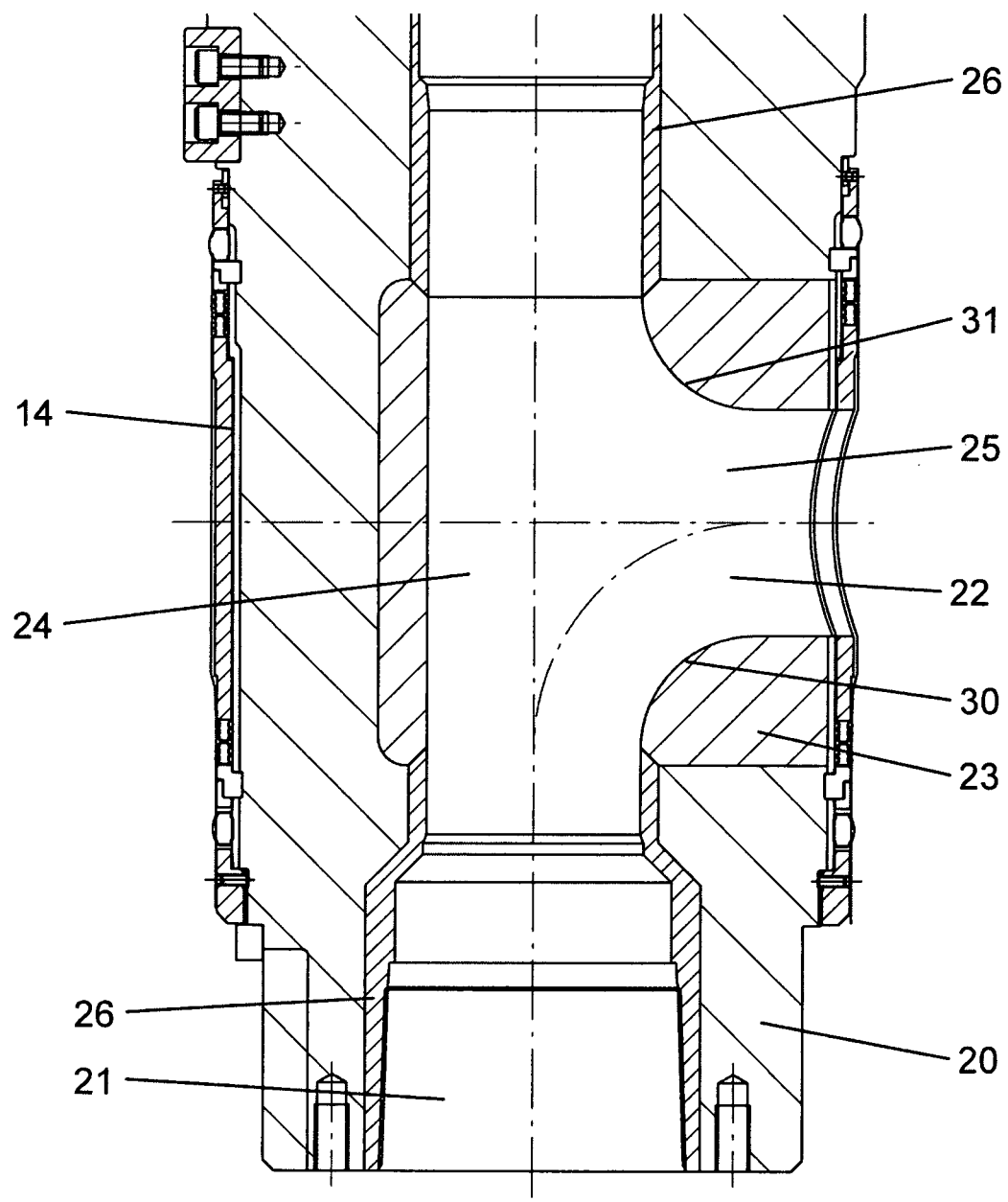
FIG. 3 shows a cross section of a block according to a second embodiment including a main bore and a side outlet.

A further example is shown in FIG. 3 where the insert 23 is provided with two curved surfaces 30 and 31 formed at the inside and outside corners of the flow path between the main bore 21 and the outlet bore. In use, when fluid flows from the main bore 21 to the outlet bore via the first bore 24 and the second bore 25 of the insert, the flow will tend to overshoot the second bore 25 (flowing towards the top of the tubing hangar as shown in FIG. 3), and then doubles back on itself to flow out through side outlet via the second bore 25. The provision of the second curved surface 31 helps to reduce the overshoot and the turbulence in the fluid that has "overshot" the second bore 25.

Figure 4:
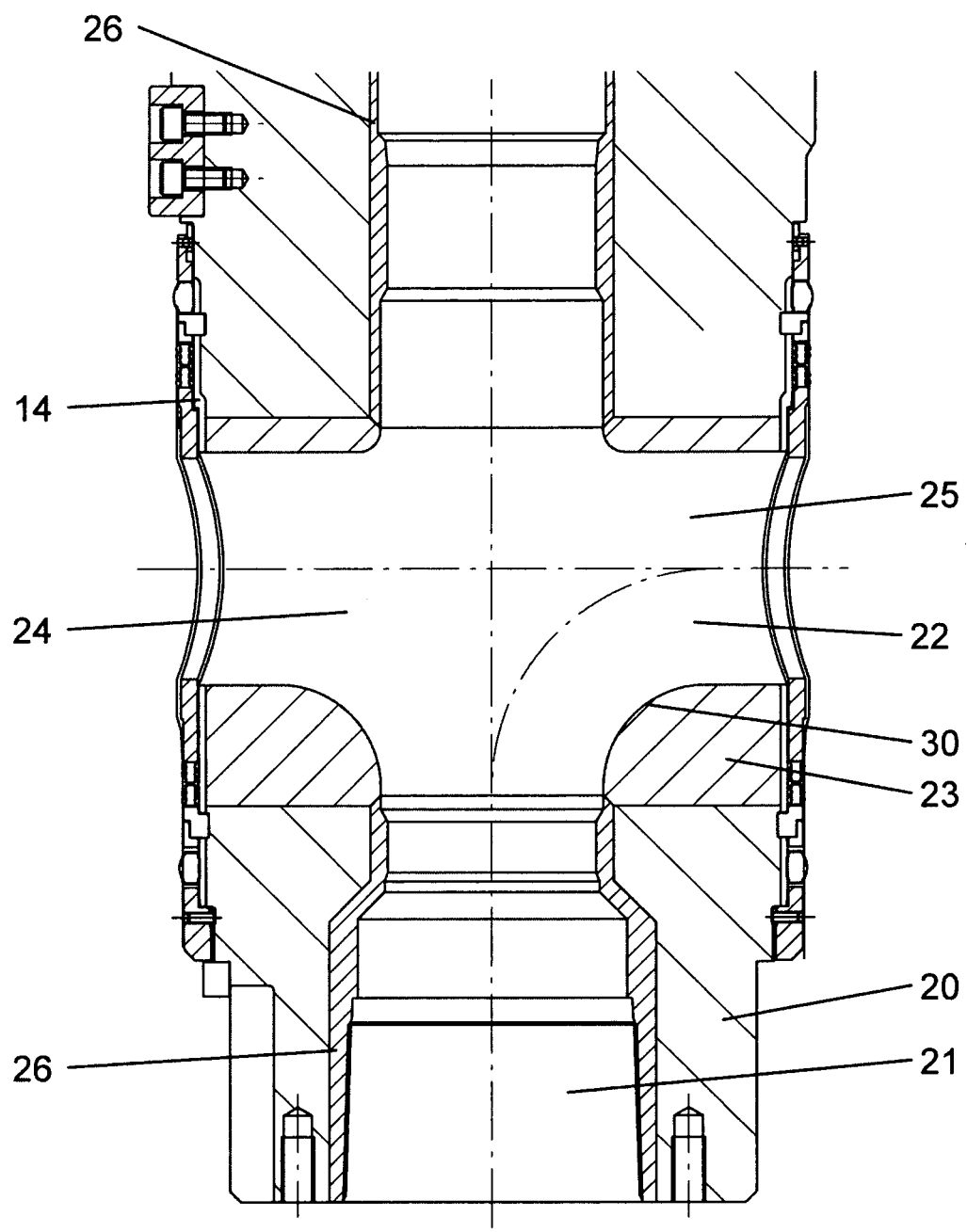
FIG. 4 shows a cross section of a block according to a third embodiment including a main bore and two side outlets.

FIG. 4 shows a further example of the invention where two side outlets will be provided, the insert 23 being modified to extend through the entire body 20 of the tubing hangar. The use of two lateral side outlets means that the two side outlets can each be of a smaller diameter compared to a single side outlet. For instance, if the diameter of the main bore 21 is seven inches (17.78 cm) then the diameter of each of the side outlets can be five inches (12.7 cm) each. An advantage of using smaller side outlet is that smaller valves can be used in the side outlets.

Figure 5:
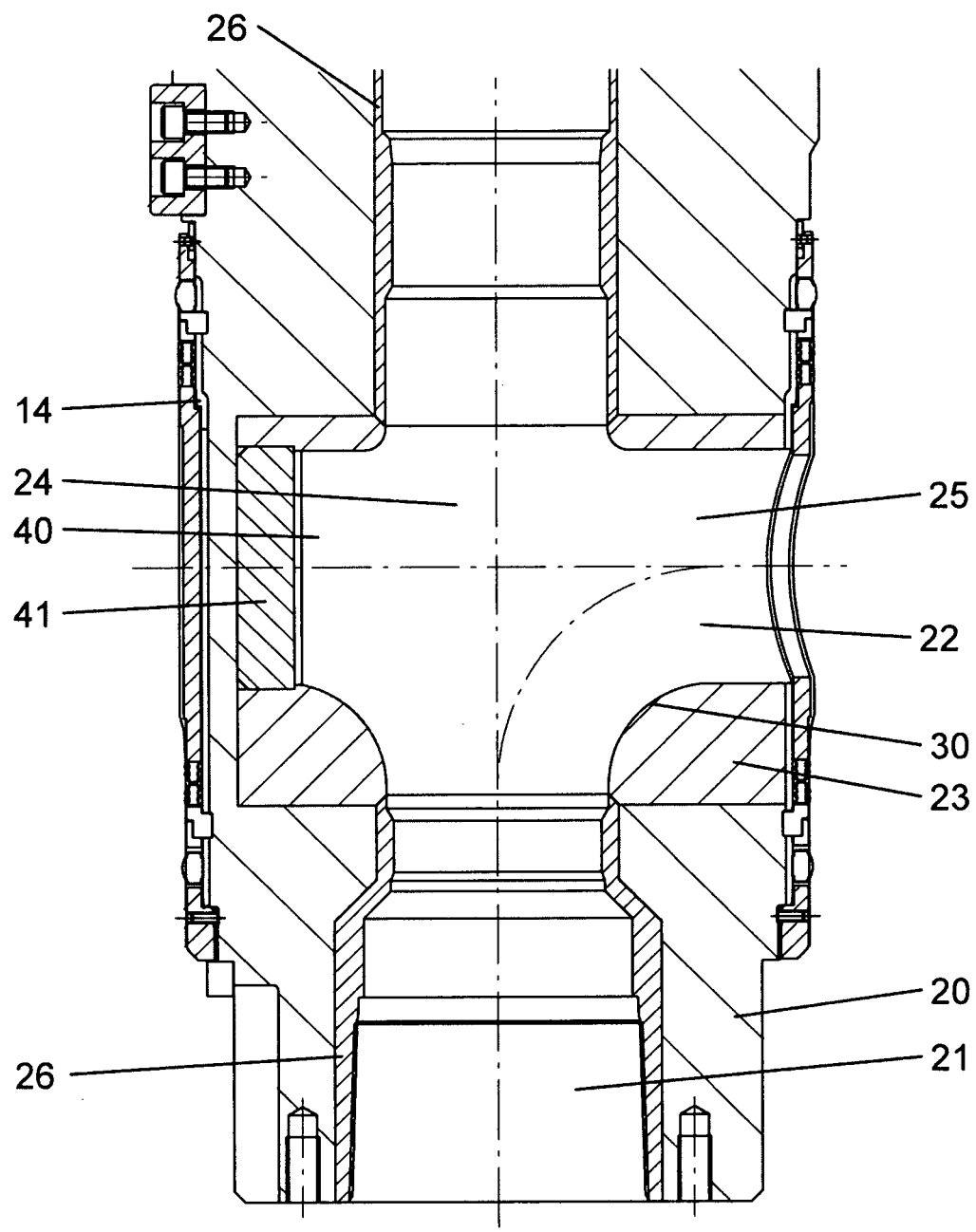
FIG. 5 shows a cross section of block according to a fourth embodiment including a main bore and a side outlet which forms an inlet for fluid injection.

FIG. 5 shows a further example. In FIG. 5, the flow of fluid is from the side outlet to the main bore 21, via the insert 23. In this case, fluid is injected through the side outlet down the main bore 21. The insert 23 is provided with a hydraulic buffer zone 40 opposite the second bore 25. The hydraulic buffer zone 40 helps to prevent the injected fluid from damaging the interior surface of the bores. In this example, the insert 23 is machined in a similar manner to the insert shown in FIG. 4, that is with the second bore 25 extending completely through the insert. This allows the curved surface to be machined on both sides of the insert. Then the opening on the insert that is opposite the side outlet is plugged with an nickel alloy plug as shown at 41.

Figure 6:
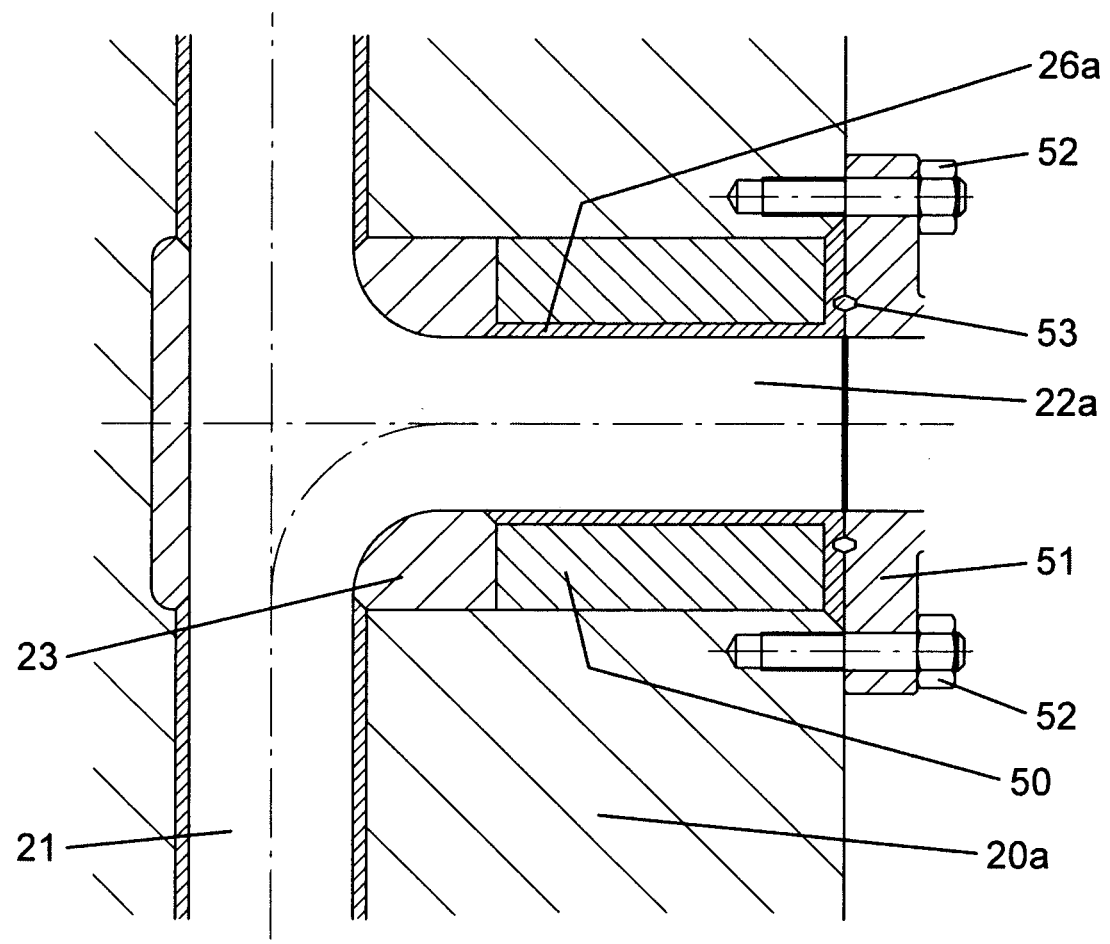
FIG. 6 shows a cross section of a block according to a fifth embodiment including an enlarged body.

FIG. 6 shows a further example. In this example the main bore 21 is located in a body 20a which has a greater cross sectional area than the bodies 20 previously described. The opening 22a in the body 20a therefore projects further into the body 20a than the openings 22 previously described. The insert 23 is inserted into the opening 22a and then a filler sleeve 50 is inserted into the opening 22a such that it abuts against the insert 23 as shown in FIG. 6. The filler sleeve 50 is typically fabricated from steel and forms a friction fit with the body 20a. The wetted surfaces of the bores are clad with nickel alloy as previously described, along with the inner surface of the filler sleeve 50 such that nickel alloy cladding 26a forms a flush surface with the insert 23. In FIG. 6 a side outlet 51 is also shown. The side outlet is retained in place by bolts 52 and is sealed against the body 20a with a gasket 53.

Figure 7:
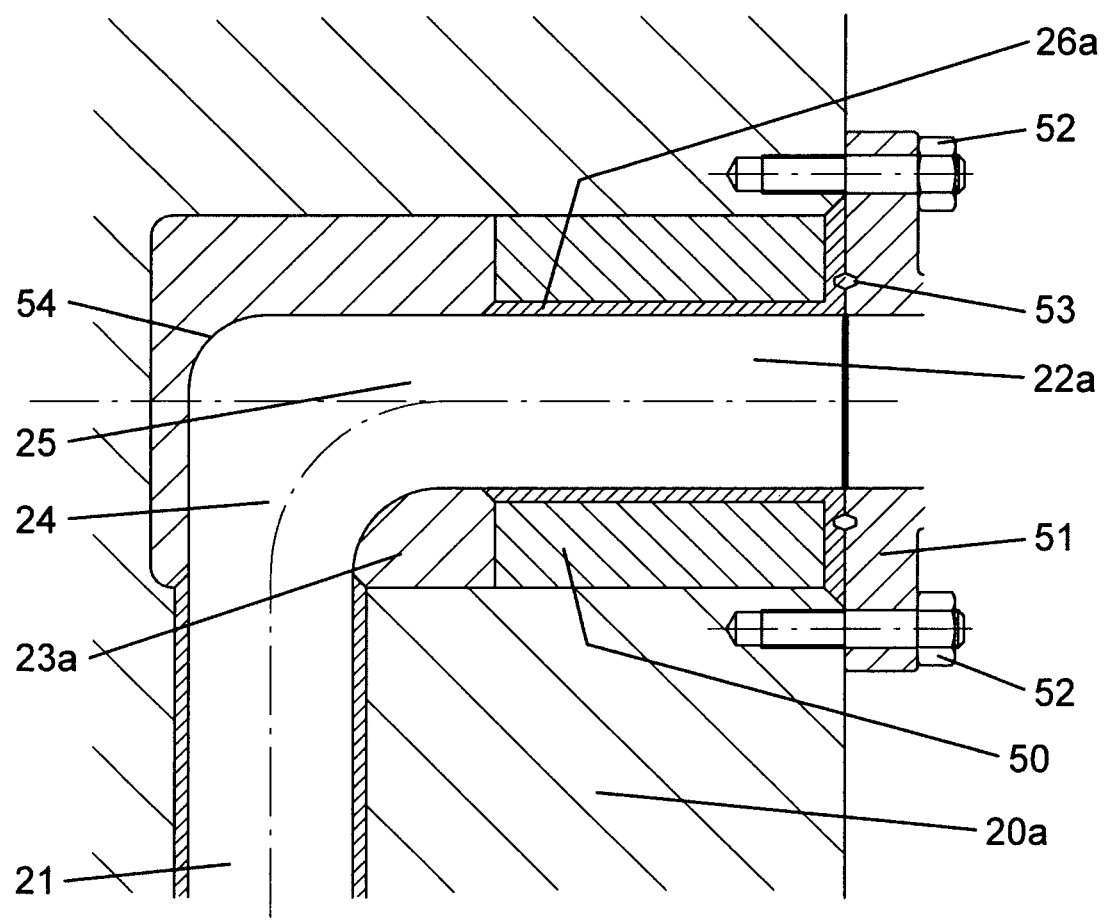
FIG. 7 shows a cross section of a block according to a sixth embodiment including an enlarged body.

FIG. 7 shows a further example similar to the example shown in FIG. 6. In this example the main bore 21 does not extend completely through the body 20a and the insert 23a is modified such that the first bore 24 does not extend completely through the insert 23a. A curved surface 54 is machined in the insert 23a on the outside corner of the fluid flow as well as the inside corner.

Further improvements can be found by enlarging the diameter of the main bore 21 in the body 20 such that the maximum velocity of the fluid in the main bore 21 is reduced, which in turn reduces the turbulence in the fluid. This is illustrated in FIGS. 8a and 8b which shows a completion tubing of various diameters 27a and 27b connected to the body 20 at the end of the body 29. The diameter of the bore at 27a is 5 inches and the diameter of the bore at 27b and within the body 20 is 7 inches. The diameter of the side outlet is 5 inches. The use of an enlarged main bore 21 also allows the curved surface 30 to be formed around the entire intersection of the main bore 21 and the side outlet. In this example, with an enlarged diameter bore and the curved surface formed around the entire intersection, the maximum velocity increase is only 15%.

The inserts described above are machined from a solid block of nickel alloy although they could also be formed from some other suitable material such as tungsten, Inconel®, Stellite®, or low alloy steel. If the insert is manufactured from tungsten it is not possible for the insert to be nickel alloy welded to the bore. Instead, the tungsten insert would have to be locked in by a flange on the side outlet or by a mechanical sleeve. A tungsten insert is hard enough to withstand the corrosion, erosion, hydrogen or carbon dioxide embrittlement caused by the production fluid or water injection fluid and so does not need to be clad.

The embodiments have also been described with reference to a tubing hanger. However, it should be noted that the invention is not limited to a tubing hanger and could equally be applied to any T-Block, tree block, manifold block or valve block. In the case of a tubing hanger, the insert should be made as compact as possible. This is because a tubing hanger is a critical structure support member in a wellhead and may have to support up to 500,000 pounds weight (227 tons). This load has to be supported by the parent metal of the tubing hanger and it is therefore desirable to minimize the amount of parent metal removed from the body of the tubing hanger.

The invention claimed is:

1. A tubing hanger to support a completion tubing, including:
   a body including an exterior, a main bore, and a side bore extending between the main bore and the exterior; and
   an insert insertable from the exterior through the side bore and including a first bore and a second bore, the first bore being alignable and concentric with the main bore, the second bore intersecting the first bore at an intersection;
   wherein the intersection defines an inside corner and an outside corner of a fluid flow path; and
   wherein a substantially curved surface is positioned at one or more of the inside and outside corners.

2. A tubing hanger according to claim 1, wherein the substantially curved surface is positioned at the outside corner of the fluid flow path.

3. A tubing hanger according to claim 1, wherein the substantially curved surface is provided around the entire intersection.

4. A tubing hanger according to claim 1, wherein the radius of the substantially curved surface is greater than approximately 25% of the diameter of the side bore.

5. A tubing hanger according to claim 1, wherein the radius of curvature of the substantially curved surface is approximately 50% of the diameter of the side bore.

6. A tubing hanger according to claim 1, wherein the substantially curved surface is a convex surface.

7. A tubing hanger according to claim 1, further including at least one weld between the body and the insert.

8. A tubing hanger according to claim 1, wherein the body and the insert are formed from the same material.

9. A tubing hanger according to claim 1, wherein the body and the insert are formed from different materials.

10. A tubing hanger according to claim 9, wherein the insert is formed from nickel alloy or Tungsten material.

11. A tubing hanger according to claim 1, wherein the side bore is perpendicular to the main bore.

12. A tubing hanger according to claim 1, wherein the side bore is at a non-ninety degree angle to the main bore.

13. A tubing hanger according to any claim 1, further including a recess in the body in a side wall of the main bore, opposite the side bore.

14. A tubing hanger according to claim 1, further including a second side bore intersecting the main bore, the second side bore being in fluid communication with the main bore; wherein the substantially curved surface is provided on at least part of the intersection between the main bore and the second side bore.

15. A tubing hanger according to claim 1, wherein the the substantially curved surface is positioned at the inside corner of the fluid flow path.

16. A tubing hanger assembly to support a completion tubing, including:
   a body including an exterior, a main bore, and an opening in the body extending between the main bore and the exterior; and
   a preformed insert including a first bore intersecting with a second bore at an intersection for fluid communication between the first bore and the second bore;
   wherein the insert is configured for insertion from the exterior through the opening in the body such that the first bore is aligned and concentric with the main bore and the second bore intersects the first bore and is aligned with the opening to establish fluid communication between the main bore and the opening through the insert; and
   wherein the insert includes a substantially curved inner surface on at least a part of the intersection between the first bore and the second bore.

* * * * *